United States Patent

Ishigaki et al.

(10) Patent No.: US 9,500,911 B2
(45) Date of Patent: Nov. 22, 2016

(54) LIQUID CRYSTAL DISPLAY PANEL

(71) Applicant: Japan Display Inc., Tokyo (JP)

(72) Inventors: Toshimasa Ishigaki, Tokyo (JP); Daisuke Sonoda, Tokyo (JP); Miharu Otani, Tokyo (JP); Tsutomu Ishibashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 1 day.

(21) Appl. No.: 14/488,492

(22) Filed: Sep. 17, 2014

(65) Prior Publication Data

US 2015/0077694 A1    Mar. 19, 2015

(30) Foreign Application Priority Data

Sep. 18, 2013  (JP) .................................. 2013-192959

(51) Int. Cl.
*G02F 1/1339*      (2006.01)
(52) U.S. Cl.
CPC . *G02F 1/13394* (2013.01); *G02F 2001/13398* (2013.01)
(58) Field of Classification Search
CPC ................. G02F 1/13394; G02F 2001/13398
USPC ........................................................ 349/156
See application file for complete search history.

(56) References Cited

U.S. PATENT DOCUMENTS

| 2003/0048403 | A1  | 3/2003  | Satoh |
|---|---|---|---|
| 2006/0227280 | A1* | 10/2006 | Tawaraya ............ G02F 1/13394 349/158 |
| 2012/0314144 | A1* | 12/2012 | Sugita ................ H04N 13/0404 349/15 |

FOREIGN PATENT DOCUMENTS

| JP | 2002-341354 A | 11/2002 |
|---|---|---|
| JP | 2003-84289 A  | 3/2003 |
| JP | 2003-121857 A | 4/2003 |

* cited by examiner

*Primary Examiner* — Thanh-Nhan P Nguyen
(74) *Attorney, Agent, or Firm* — Typha IP LLC

(57) ABSTRACT

Provided is a liquid crystal display panel in which both the prevention of low-temperature bubble defects and the prevention of unevenness in brightness by pressure can be achieved without the need of forming multiple types of spacers differing in the height. In a liquid crystal display panel comprising a plurality of spacers 14 arranged between a pair of transparent substrates 11 and 12 and a liquid crystal 13 encapsulated between the transparent substrates, the spacers 14 are of a uniform height and each spacer 14 is substantially in a trapezoidal shape in which the ratio between the top area and the bottom area is 0.3 or less. The spacers 14 are formed on one of the transparent substrates 11 and 12. The spacers 14 are arranged at appropriate density so that the contact area ratio of the spacers' top surfaces in contact with the opposing substrate per unit area is within a range of 0.8%-1.0%.

2 Claims, 4 Drawing Sheets

| MASK DIAMETER ($\mu$m) | 11 | 6 | 5 | 4 | 3 |
|---|---|---|---|---|---|
| MEASURED COLUMN DIAMETER ($\mu$m) | 9.7 | 4.9 | 4.0 | 3.2 | 2.1 |
| COLUMN AREA ($\mu$m$^2$) | 73.9 | 18.9 | 12.6 | 8.0 | 3.5 |
| THE NUMBER OF COLUMNS FOR ACHIEVING FIXED AREA (PCS) | 1 | 3.9 | 5.9 | 9.2 | 21.3 |
| LOAD APPLIED ON EACH COLUMN (TEMPORARY VALUE) | 10.0 | 2.6 | 1.7 | 1.1 | 0.5 |
| DEFORMATION ($\mu$m) | 0.20 | 0.19 | 0.19 | 0.21 | 0.21 |

|  | EXAMPLE (1) | COMPARATIVE EXAMPLE (1) | COMPARATIVE EXAMPLE (2) |
|---|---|---|---|
| TOP DIAMETER (μm) | 4.1 | 9.7 | 4.0 |
| BOTTOM DIAMETER (μm) | 10.2 | 10.4 | 4.7 |
| BLACK MODULATION FACTOR (%) | 0.3 | 1.4 | 1.1 |

FIG. 7

| | HEIGHT ($\mu m$) | TOP DIAMETER ($\mu m$) | BOTTOM DIAMETER ($\mu m$) | TOP AREA ($\mu m^2$) | BOTTOM AREA ($\mu m^2$) | TOP AREA/ BOTTOM AREA | CONTACT AREA RATIO (%) | LOW-TEMPERATURE IMPACT BUBBLE | UNEVENNESS IN BRIGHTNESS BY PRESSURE |
|---|---|---|---|---|---|---|---|---|---|
| EXAMPLE (2) | 4 | 3.5 | 7 | 9.6 | 38.5 | 0.25 | 0.8 OR LESS | ○ | × |
| | | | | | | | 0.9~1.0 | ○ | ○ |
| | | | | | | | 1.1 OR MORE | × | ○ |
| EXAMPLE (3) | 4 | 3.5 | 9 | 9.6 | 63.6 | 0.15 | 0.7 OR LESS | ○ | × |
| | | | | | | | 0.8~0.9 | ○ | ○ |
| | | | | | | | 1.0 OR MORE | × | ○ |
| EXAMPLE (4) | 4 | 4.5 | 9 | 15.9 | 63.6 | 0.25 | 0.8 OR LESS | ○ | × |
| | | | | | | | 0.9~1.0 | ○ | ○ |
| | | | | | | | 1.1 OR MORE | × | ○ |
| EXAMPLE (5) | 4 | 5.5 | 11 | 23.8 | 95.0 | 0.25 | 0.8 OR LESS | ○ | × |
| | | | | | | | 0.9~1.0 | ○ | ○ |
| | | | | | | | 1.1 OR MORE | × | ○ |
| COMPARATIVE EXAMPLE (3) | 4 | 3.5 | 6 | 9.6 | 28.3 | 0.34 | 0.8 OR LESS | ○ | × |
| | | | | | | | 0.9~1.1 | × | × |
| | | | | | | | 1.2 OR MORE | × | ○ |
| COMPARATIVE EXAMPLE (4) | 4 | 4.5 | 8 | 15.9 | 50.3 | 0.32 | 0.8 OR LESS | ○ | × |
| | | | | | | | 0.9~1.0 | × | × |
| | | | | | | | 1.1 OR MORE | × | ○ |
| COMPARATIVE EXAMPLE (5) | 4 | 6 | 10 | 28.3 | 78.5 | 0.36 | 0.7 OR LESS | ○ | × |
| | | | | | | | 0.8~1.1 | × | × |
| | | | | | | | 1.2 OR MORE | × | ○ |
| COMPARATIVE EXAMPLE (6) | 4 (MAIN) | 7 | 11 | 38.5 | 95.0 | 0.40 | 0.1 | ○ | ○ |
| | 3.5 (SUB) | 6 | 10 | 28.3 | 78.5 | 0.36 | 1.2 | | ○ |

LIQUID CRYSTAL DISPLAY PANEL

CLAIM OF PRIORITY

The present application claims priority from Japanese Patent Application JP 2013-192959 filed on Sep. 18, 2013, the content of which is hereby incorporated by reference into this application.

BACKGROUND OF THE INVENTION

1. Field of the Invention

The present invention relates to a liquid crystal display panel, and in particular, to a liquid crystal display panel in which a liquid crystal gap is secured by arranging spacers between transparent substrates.

2. Description of the Related Art

Liquid crystal display panels (LCDs) are used as display devices of a variety of portable information devices such as cellular phones, personal digital assistants (PDAs), digital cameras and multimedia players.

The liquid crystal display panel comprises a liquid crystal encapsulated between a pair of transparent substrates made of glass, resin or the like and performs the image display by driving and controlling the liquid crystal molecules by use of an electric field. One of the transparent substrates is used as an array substrate having a surface on which a plurality of thin-film transistors (TFTs) are arranged in an array. The other transparent substrate is used as a color filter substrate having a surface on which a black matrix (BM) and color filters are arranged.

In recent liquid crystal display panels, it has become common to maintain the substrate distance between the two transparent substrates (liquid crystal gap) by arranging spacers between the substrates. However, low-temperature bubble defects and unevenness in brightness by pressure occur even in such liquid crystal display panels having the spacers between the transparent substrates, and thus countermeasures for preventing the low-temperature bubble defects and the unevenness in brightness by pressure are being requested. The low-temperature bubble defects are display defects caused by vacuum bubbles (low-temperature bubbles) forming in the liquid crystal layer when the substrate distance cannot change smoothly following the volume contraction of the liquid crystal in a low-temperature environment. The unevenness in brightness by pressure is a display defect occurring in regions of the liquid crystal display panel where the substrate distance has become nonuniform due to external pressure locally applied to a surface of a transparent substrate.

Technologies for preventing the low-temperature bubble defects and the unevenness in brightness by pressure by arranging columnar spacers differing in the height have been disclosed in JP-A-2002-341354, JP-A-2003-84289, and JP-A-2003-121857. Specifically, the low-temperature bubble defects are prevented by allowing the substrate distance to decrease flexibly due to elastic deformation of the higher spacers. The unevenness in brightness by pressure is prevented by inhibiting excessive decrease in the substrate distance by having both the higher spacers and the lower spacers receive the applied load.

SUMMARY OF THE INVENTION

Extensive efforts are being made in recent years to further increase the definition of liquid crystal display panels. To increase the definition, it is essential to secure high optical transmittance and high luminance of the liquid crystal display panel. For this purpose, a sufficient pixel aperture ratio has to be secured. The pixel aperture ratio is the area ratio between one pixel region of the liquid crystal and a region in the one pixel region effective for the displaying (region other than ineffective parts such as the BM). Therefore, how to reduce the area of the BM regions is especially important in order to achieve a sufficient pixel aperture ratio in a high-definition liquid crystal display panel.

The spacers are generally formed in the BM regions. For example, the spacers are arranged at intersecting parts of the lattice-shaped BM (at the corner positions of the pixels). Even the most miniaturized spacer is in a size of approximately $\phi 10$ μm at present. In liquid crystal display panels having resolution within 400 ppi, a sufficient pixel aperture ratio can be achieved even if a BM region of a size over 20 μm×15 μm is formed between adjoining intersecting parts of the lattice, and thus spacers larger than $\phi 10$ μm can be arranged in the BM regions.

However, in high-definition liquid crystal display panels having resolution over 400 ppi, it is necessary to reduce the area of the BM in order to secure a pixel aperture ratio equivalent to that of conventional liquid crystal display panels. Accordingly, miniaturization of the spacers becomes necessary.

Incidentally, the formation of multiple types of spacers differing in the height is carried out generally by use of a multi-tone mask. The multi-tone mask (gray-tone mask, half-tone mask, etc.) is a mask having not only regions of 0% transmittance and regions of 100% transmittance but also regions of intermediate transmittance. By using such a multi-tone mask, it is possible to intentionally decrease the amount of light exposure and thereby increase the reduction in the thickness of the development layer at the parts where the lower spacers should be formed. Consequently, multiple types of spacers differing in the height can be formed at the same time by one photolithography process.

The formation of multiple types of spacers differing in the height according to the above method has been possible with no problem if the spacer diameter is 10 μm or greater. However, such formation becomes difficult as the spacer diameter decreases below 10 μm. Especially, the height adjustment of the lower spacers rapidly becomes difficult.

To sum up, with the progress of the miniaturization of the spacers accompanying the increase in the definition of liquid crystal display panels, the formation of multiple types of spacers differing in the height becomes difficult, and consequently, it becomes difficult to achieve both the prevention of the low-temperature bubble defects and the prevention of the unevenness in brightness by pressure.

It is therefore the primary object of the present invention to resolve the above problem and achieve both the prevention of the low-temperature bubble defects and the prevention of the unevenness in brightness by pressure without the need of forming multiple types of spacers differing in the height.

To achieve the above object, a liquid crystal display panel according to an aspect of the present invention has the following characteristic features:

(1) In a liquid crystal display panel comprising a plurality of spacers arranged between a pair of transparent substrates and a liquid crystal encapsulated between the transparent substrates, the spacers are of a uniform height and each spacer is substantially in a trapezoidal shape in which the ratio between the top area and the bottom area is 0.3 or less.

(2) In the above liquid crystal display panel, the spacers are arranged at appropriate density so that the contact area ratio of the spacers' top surfaces in contact with one of the transparent substrates per unit area is within a range of 0.8%-1.0%.

By forming each spacer (arranged between the transparent substrates) substantially in a trapezoidal shape in which the ratio between the top area and the bottom area is 0.3 or less according to the present invention, both the prevention of the low-temperature bubble defects and the prevention of the unevenness in brightness by pressure can be achieved while using spacers of a uniform height.

BRIEF DESCRIPTION OF THE DRAWINGS

FIG. 7 is a table showing the result of evaluation of spacers according to examples (2)-(5) and comparative examples (3)-(6).

DESCRIPTION OF THE PREFERRED EMBODIMENTS

Figure 1:
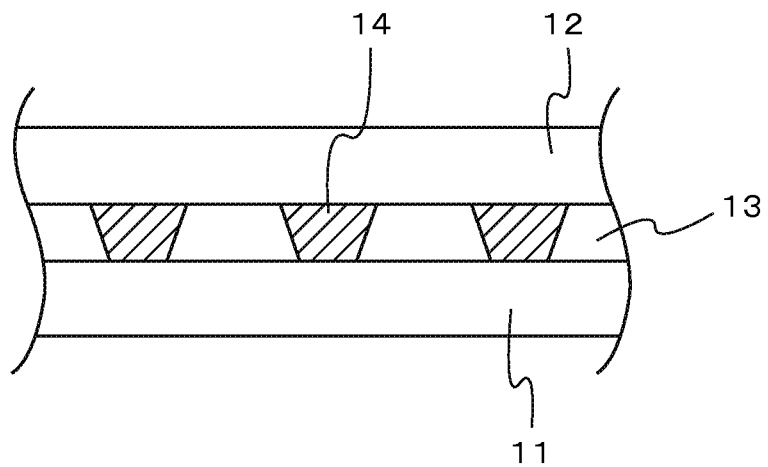
FIG. 1 is a vertical sectional view for explaining an embodiment of a liquid crystal display panel in accordance with the present invention.

Referring now to the drawings, a description will be given in detail of preferred embodiments of the present invention.

FIG. 1 is a vertical sectional view for explaining an embodiment of a liquid crystal display panel in accordance with the present invention. The liquid crystal display panel shown in FIG. 1 is characterized in that in a liquid crystal display panel comprising a plurality of spacers 14 arranged between a pair of transparent substrates 11 and 12 and a liquid crystal 13 encapsulated between the transparent substrates, the spacers 14 are of a uniform height and each spacer 14 is substantially in a trapezoidal shape in which the ratio between the top area and the bottom area is 0.3 or less.

The transparent substrates 11 and 12 are made of transparent material such as glass or resin. One of the transparent substrates 11 and 12 is used as an array substrate having a substrate surface on which an array of TFTs is arranged. The other substrate is used as a color filter substrate having a substrate surface on which a BM (Black Matrix) and color filters are arranged. In this embodiment, the transparent substrate 11 is used as the array substrate and the transparent substrate 12 is used as the color filter substrate.

While illustration is omitted in FIG. 1, alignment layers for setting the alignment (orientation) of the liquid crystal molecules 13 between the transparent substrates 11 and 12 are formed on the opposing surfaces of the transparent substrates 11 and 12. The rubbing treatment has been performed on the alignment layers in order to provide the alignment layers with the alignment function.

Between the pair of transparent substrates 11 and 12, a plurality of spacers 14 of a uniform height are arranged.

While the spacers 14 are arranged in the BM regions of the transparent substrate 12 (color filter substrate) in this embodiment, it is also possible to arrange the spacers 14 on the transparent substrate 11 (array substrate). In this case, the spacers 14 are desired to be arranged in regions facing the BM regions.

Each of the spacers 14 is in a trapezoidal shape in which the top area is smaller than the bottom area. In this embodiment, a spacer in the shape of a circular truncated cone (frustum of a circular cone), having a circular cross-sectional shape along a substrate plane, is used as each spacer 14.

Such a trapezoidal spacer 14, having a thin tip end part, is characterized in that the spacer is easily deformed (soft) while the load in the direction for crushing (flattening out) the spacer 14 (load in the direction for narrowing the distance between the transparent substrates 11 and 12) is low. Thus, even by a light load caused by volume contraction of the liquid crystal 13 in a low-temperature environment, the spacers 14 are easily deformed, allowing the distance between the transparent substrates 11 and 12 to change smoothly following the volume contraction of the liquid crystal 13. This is effective for preventing the low-temperature bubble defects which occur when the substrate distance cannot smoothly follow the volume contraction of the liquid crystal 13 in a low-temperature environment.

Further, the trapezoidal spacer 14, gradually thickening toward the bottom, is characterized in that the spacer becomes hard to deform (hardens) with the increase in the load in the direction for crushing (flattening out) the spacer 14. Thus, with the increase in the load, the withstand load of the trapezoidal spacers 14 increases and the function of maintaining the distance between the transparent substrates 11 and 12 strengthens. This is effective for preventing the unevenness in brightness by pressure which occurs when the substrate distance becomes nonuniform due to external pressure locally applied to a substrate surface.

The above characteristics of the trapezoidal spacer 14 (the deformation is large (soft) at light loads but decreases (hardens) with the increase in the load) vary depending on the ratio between the top area and the bottom area in the trapezoidal shape.

In this embodiment, the above characteristics were achieved in good balance that is effective for both the prevention of the low-temperature bubble defects and the prevention of the unevenness in brightness by pressure when the ratio between the top area and the bottom area was 0.3 or less. Thus, the prevention of the low-temperature bubble defects and the prevention of the unevenness in brightness by pressure were both achieved successfully while using spacers of a uniform height. In contrast, when the ratio between the top area and the bottom area was over 0.3, it was impossible to achieve the above characteristics in good balance effective for both the prevention of the low-temperature bubble defects and the prevention of the unevenness in brightness by pressure. In this case, the achievement of both the prevention of the low-temperature bubble defects and the prevention of the unevenness in brightness by pressure was impossible unless spacers of different heights were used in combination.

Figure 2:
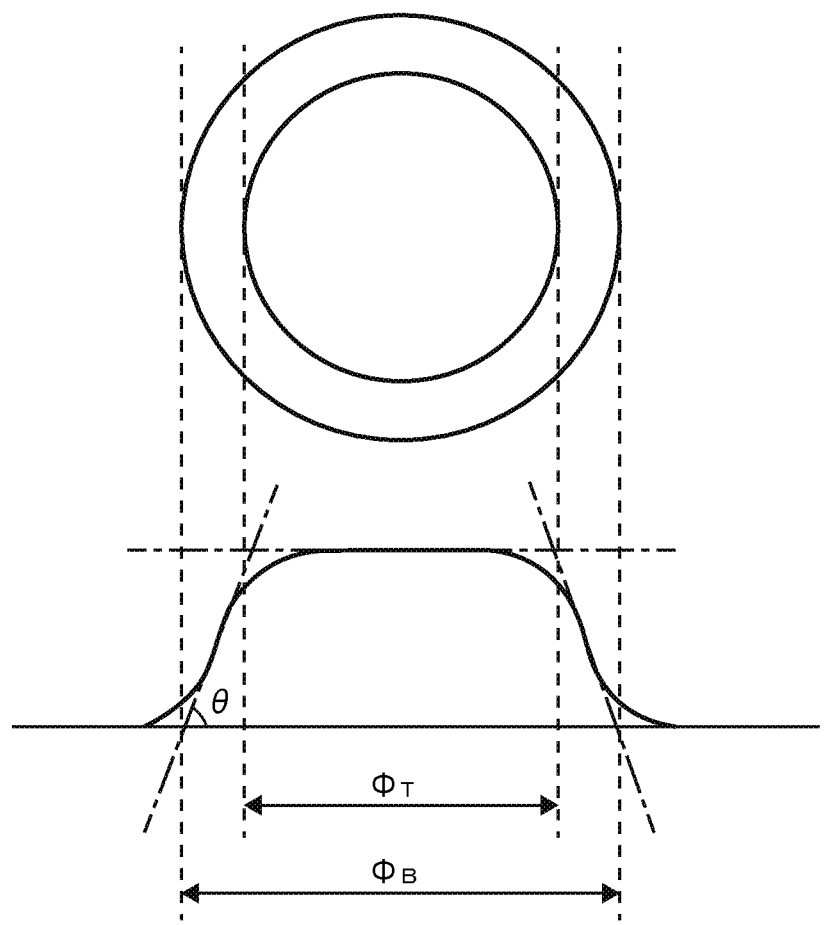
FIG. 2 is a schematic diagram for explaining a top diameter and a bottom diameter of a spacer.

The spacer 14 in this embodiment may also be in a trapezoidal shape other than the aforementioned circular truncated cone shape. For example, a spacer in the shape of a truncated pyramid (frustum of a pyramid), having a polygonal cross-sectional shape along a substrate plane, is also usable as each spacer 14. A spacer in a trapezoidal shape having rounded top and bottom as shown in FIG. 2 (explained later) is also usable as each spacer 14 in the present invention. In the present invention, the inclined part of the spacer 14 between the top and the bottom may also be formed in a step-like shape, for example. The expression "substantially in a trapezoidal shape" in the present invention means that such a variety of trapezoidal shapes are possible.

As described above, spacers 14 that are substantially in trapezoidal shapes in which the ratio between the top area and the bottom area is a prescribed value or less are used in the present invention, by which both the prevention of the low-temperature bubble defects and the prevention of the unevenness in brightness by pressure can be achieved successfully while using spacers of a uniform height. In other words, it is unnecessary to form multiple types of spacers differing in the height for the purpose of achieving both the prevention of the low-temperature bubble defects and the prevention of the unevenness in brightness by pressure.

It is especially desirable to arrange the spacers 14 at appropriate density so that the contact area ratio of the spacers' top surfaces in contact with one of the transparent substrates 11 and 12 (the transparent substrate 11 (array substrate) in this embodiment) per unit area is within a prescribed range. With this configuration, the function of preventing the low-temperature bubble defects and the unevenness in brightness by pressure can be achieved more effectively.

Here, a method for calculating the top area and the bottom area of the trapezoidal spacer 14 will be explained briefly. The upper part and the lower part of FIG. 2 show a plan view and a side view of the spacer 14, respectively. As shown in FIG. 2, the actual spacer 14 is not in a perfect trapezoidal shape but in a slightly rounded trapezoidal shape. Specifically, from the substrate surface, the inclination angle of the lateral surface of the spacer 14 gradually increases to θ, thereafter remains at θ for a while (forming an inclined surface at the inclination angle θ), and thereafter gradually decreases till the lateral surface reaches the planar top surface.

In cases where the spacer 14 is in a rounded trapezoidal shape, the boundary of the top surface and that of the bottom surface are not clear, and thus it is necessary to devise a method of calculating the top area and the bottom area. In this embodiment, intersection points of the substrate surface and imaginary lines at the inclination angle θ extending along the inclined surface of the spacer 14 are regarded as the boundary of the bottom surface, and the bottom area is calculated on the basis of the result of measurement of the diameter of the bottom surface's boundary (bottom diameter $\Phi B$). Meanwhile, intersection points of the above imaginary lines and a plane including the top surface of the spacer 14 are regarded as the boundary of the top surface, and the top area is calculated based on the result of measurement of the diameter of the top surface's boundary (top diameter $\Phi T$). An area ratio between the top surface and the bottom surface is defined as $(\Phi T)^2/(\Phi B)^2$.

In cases where the lateral surface of the substantially trapezoidal spacer 14 is formed in a step-like shape (having two or more steps), the calculation of the top area can be performed by use of the uppermost trapezoidal part, and the calculation of the bottom area can be performed by use of the lowermost trapezoidal part.

The trapezoidal spacers 14 also have the following advantages in addition to the effectiveness for the prevention of the low-temperature bubble defects and the unevenness in brightness by pressure:

Compared to columnar spacers, the trapezoidal spacers 14 less obstruct the rubbing treatment. In the rubbing treatment, the orientation is given to the alignment layer on each substrate surface by rubbing the alignment layer with cloth in a prescribed direction. When columnar spacers are used, it is difficult for the cloth to reach the part around the roots of the columnar spacers and the rubbing of the part tends to be insufficient. In contrast, the inclined surfaces of the trapezoidal spacers 14 are not steep but at a gentle angle, and thus the cloth easily reaches the inside parts around the roots of the spacers compared to the cases of columnar spacers and the rubbing can be performed sufficiently to the inside parts around the roots of the spacers 14.

Consequently, the orientation can be appropriately given also to the regions in the vicinity of the spacers 14 and the orientation of the liquid crystal molecules can be aligned uniformly. This makes it possible to reduce the area of the BM regions (for taking care of the light leakage caused by disturbance in the liquid crystal molecule orientation) compared to cases where columnar spacers of the same installation area are used. Consequently, the pixel aperture ratio can be increased and high transmittance and high luminance can be secured excellently even in high-definition liquid crystal display panels. This leads to the quality improvement of liquid crystal display panels.

Further, since the formation of multiple types of spacers differing in the height is unnecessary, the quality of finished products of liquid crystal display panels can be stabilized even on a minute scale where the formation of multiple types of spacers differing in the height is difficult. Consequently, the quality and the manufacturing yields of liquid crystal display panels can be increased.

Furthermore, since the formation of multiple types of spacers differing in the height is unnecessary, the multi-tone mask for creating the difference in the height becomes unnecessary. Since the spacers 14 can be produced by use of a single-tone mask which is cheaper than the multi-tone mask, the cost for the mask used for producing the spacers can be reduced.

Moreover, since the adjustment of the withstand load of the spacers 14 (adjustment of the spacer diameter) can be made by increasing/decreasing the amount of exposure (light exposure) in the production of the spacers, it is unnecessary to change the single-tone mask for the adjustment of the withstand load. Thus, even when the withstand load of produced spacers differ from expectation (intended value), it is unnecessary to remake the single-tone mask for the production of the spacers 14. In contrast, in the case where the formation of multiple types of spacers differing in the height is implemented by use of a multi-tone mask, the increasing/decreasing of the amount of exposure causes the change of diameter to both the higher spacers and the lower spacers. Thus, the adjustment of the withstand load by just increasing/decreasing the amount of exposure is difficult and it often becomes necessary to remake the mask. As above, the mask remaking cost can be reduced according to this embodiment compared to cases where multiple types of spacers differing in the height are formed.

In the following, a result of evaluation of the trapezoidal spacers according to the present invention and the columnar spacers according to the conventional technology will be explained in detail.

(1) Production of Spacers

For the production of the columnar spacers, a commonly-used negative-type acrylic resin material was used. In such a negative-type material, when radicals (unpaired electrons) are generated due to the photolysis of a polymerization initiator, radical polymerization occurs between double bonds of the acrylic resin and double bonds of an acrylic crosslinking agent. Accordingly, the molecular weight increases and a pattern is formed due to insolubilization against the developing solution. By use of such a mechanism, a spacer pattern was formed by applying the negative-type material on the surface of a substrate, light-exposing the substrate via a mask having openings corresponding to the parts to be left as the spacers, performing the development by using an alkaline developing solution, and rinsing the substrate (having the developed pattern thereon) with pure water. Thereafter, the substrate with the spacer pattern was heated in an oven at 230° C. for 30 minutes to promote the crosslinking reaction and increase the strength, by which the spacers were completed.

The method of the production of the trapezoidal spacers is basically equivalent to that of the columnar spacers, and thus the difference from the production of the columnar spacers will be explained below. In the production of the trapezoidal spacers, the spacer pattern was formed while reducing the crosslinking reaction to a minimum, by shortening the development time and adjusting the amount of exposure to the lower limit allowing for the patterning. Thereafter, the dimensional difference between the top diameter and the lower diameter was created by reflowing the spacer pattern by quickly heating the substrate on a hot plate heated at 150° C. in the oven. The fine adjustment of the dimensional difference was made by adjusting the amount of exposure and the development time.

(2) Evaluation Method a) Production of Evaluation Substrates

Each panel for the evaluation was completed by performing the rubbing treatment on a 5-inch full HD array substrate (the number of pixels: 1920×1080, 438 ppi) and a color filter substrate of the same size (having spacers formed thereon so that the spacer shape and the contact area differ from substrate to substrate), bonding the array substrate and the color filter substrate together by using a sealing material, and encapsulating the liquid crystal between the substrates. By using the panels, the presence/absence of the low-temperature bubble defects and the presence/absence of the unevenness in brightness by pressure were evaluated. Incidentally, the array substrates and the color filter substrates were produced by standard methods, and thus detailed explanation thereof is omitted for brevity.

Evaluation of the light leakage was also carried out by using cells each produced by forming spacers on a glass substrate at positions corresponding to the corners of the 5-inch full HD pixels, performing the rubbing treatment on the substrate, bonding the substrate to another glass substrate that has undergone the rubbing treatment in the same way, and encapsulating the liquid crystal between the substrates.

b) Measurement of Dimensions

The top diameter, the bottom diameter and the height of the spacers (see FIG. 2) were measured by using a laser microscope.

Since both of the trapezoidal spacers and the columnar spacers produced for the evaluation have circular top surfaces and circular bottom surfaces, the top area and the bottom area can be calculated through the measurement of the top diameter the bottom diameter.

c) Measurement of Load Deformation

The load deformation was measured by using a Fischerscope (micro hardness tester) and a 25 µm² plane indenter.

d) Evaluation of Light Leakage

Each cell was formed by arranging an array substrate, a liquid crystal layer and a color filter substrate from the bottom. Two polarizing plates were arranged to sandwich the cell. The maximum luminance value (white luminance) and the minimum luminance value (black luminance) were measured by arranging a back light at the bottom (under the array substrate), arranging a luminance meter at the top (over the color filter substrate), and rotating one of the polarizing plates. A black modulation factor was calculated according to the following expression (1): A Lower value of the black modulation factor means less light leakage.

$$\text{black modulation factor (\%)} = \text{black luminance/white luminance} \times 100 \quad (1)$$

e) Evaluation of Low-temperature Bubble Defects

Each panel for the evaluation was left at −20° C. for 24 hours. An impact was put on the panel in the −20° C. state by dropping a metallic ball (pachinko ball) onto the center of the panel from a position 10 cm above. In the −20° C. state, visual observation was carried out to check the presence/absence of the formation of bubbles.

f) Evaluation of Unevenness in Brightness by Pressure

A load of 150 N was applied onto the evaluation panel at 5-minute intervals for a total of 50 times by using a metallic bar having a φ10 mm plane tip end. Thereafter, visual observation was conducted to check the presence/absence of indentations.

(3) Result of Evaluation

First, the evaluation of the columnar spacers according to the conventional technology was carried out before the evaluation of the trapezoidal spacers according to the present invention. This evaluation was conducted by producing columnar (circular cylindrical) spacers of different sizes (diameters) by use of a mask having circular openings of different sizes and an exposure device having a lens NA (Numerical Aperture) of 0.135 (resolution: approximately 1.5 µm). Incidentally, such an exposure device having the lens NA of 0.135 (resolution: approximately 1.5 µm) is in the high-resolution class in the production of columnar spacers.

The produced columnar spacers had five column diameters (top diameters in this example) of 9.7 µm, 4.9 µm, 4.0 µm, 3.2 µm and 2.1 µm. The height of each spacer was set constant at 4 µm. The difference between the bottom diameter and the top diameter of each spacer was 1.5 µm.

Figures 3, 4:
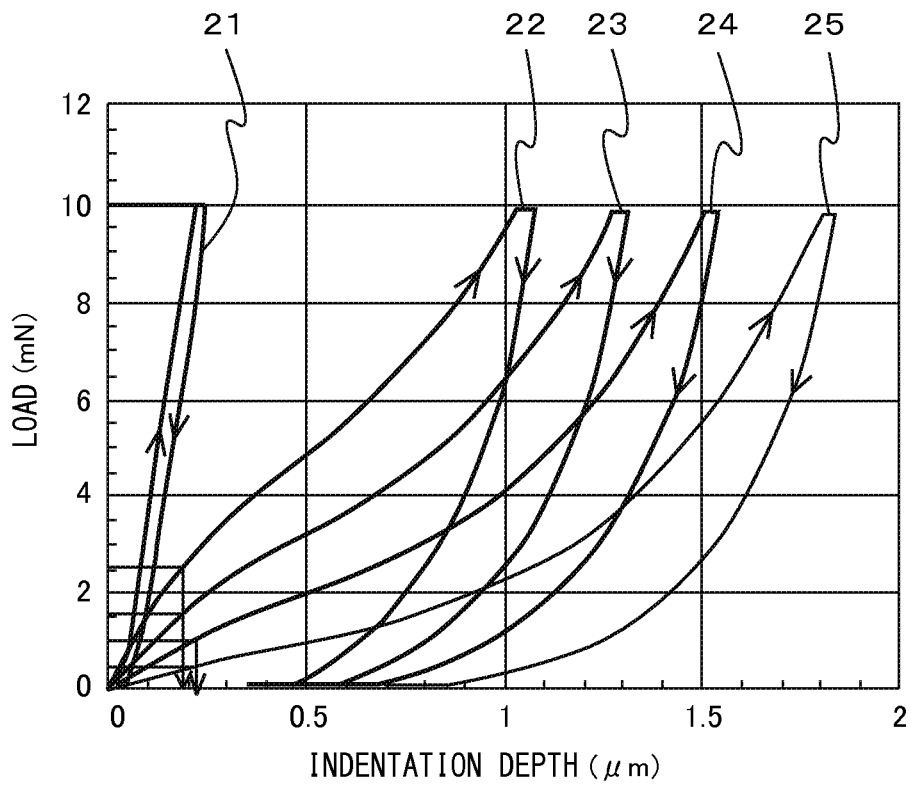
FIG. 3 is a graph showing the relationship between the load applied to each columnar spacer and the indentation depth.
FIG. 4 is a table showing the number of columnar spacers necessary for achieving a prescribed withstand load.

FIG. 3 is a graph showing the result of the measurement of the load applied to each columnar spacer and the indentation depth by use of the Fischerscope. In the graph, the vertical axis represents the load (mN) and the horizontal axis represents the indentation depth (µm). Load deformation curves indicating the relationship between the applied load and the indentation depth are shown. The load deformation curves include a load deformation curve 21 in the case where the column diameter was 9.7 µm, a load deformation curve 22 in the case where the column diameter was 4.9 µm, a load deformation curve 23 in the case where the column diameter was 4.0 µm, a load deformation curve 24 in the case where the column diameter was 3.2 µm, and a load deformation curve 25 in the case where the column diameter was 2.1 µm.

Each load deformation curve 21-25 indicates the result of the measurement of the indentation depth (deformation) along the passage of time (indicated by the arrows) in a process of gradually increasing the load applied to the columnar spacer, maintaining the applied load at 10 mN for a while (e.g., 5 seconds), and thereafter gradually reducing the applied load.

As shown in FIG. 3, the spacer of the largest column diameter (corresponding to the load deformation curve 21) exhibited a small deformation of approximately 0.2 µm even with the 10 mN load and quickly returned to the original shape after the load was removed. With the decrease in the column diameter, the load deformation increased and the time necessary for returning from the deformed shape to the original shape after the removal of the load also increased.

As above, the result shows that the resistance to the load increases proportionally to the column diameter.

FIG. 4 is a table showing the result of evaluation of the number of columnar spacers necessary for achieving a prescribed withstand load. In this table, the spacer having the 9.7 μm column diameter (produced by use of a mask having openings 11 μm in diameter) was used as the reference (reference spacer), and the number of columnar spacers (having a column diameter other than 9.7 μm) necessary for achieving a withstand load equivalent to that of the reference spacer was evaluated.

As shown in FIG. 4, the column area (the area of a plane cross section) of the reference spacer (column diameter: 9.7 μm) was 73.9 μm$^2$ and the deformation caused by applying the 10 mN load onto one reference spacer was 0.20 μm.

Meanwhile, the spacer having the 4.9 μm column diameter (produced by use of a mask having openings 6 μm in diameter) had a column area of 18.9 μm$^2$. In order to achieve a column area equivalent to that of one reference spacer, 73.9/18.9=3.9 spacers are necessary. In this case, the 10 mN load is distributed to the columnar spacers and the load applied on each columnar spacer (temporary value) equals 10/3.9=2.6 mN. It is seen from FIG. 4 that the deformation of the spacers caused by the load is 0.19 μm, which is close to the deformation of the reference spacer. Thus, a withstand load equivalent to that of one reference spacer can be achieved by 3.9 spacers of the 4.9 μm column diameter.

Similarly, the spacer having the 4.0 μm column diameter (produced by use of a mask having openings 5 μm in diameter) had a column area of 12.6 μm$^2$. In order to achieve a column area equivalent to that of one reference spacer, 5.9 spacers are necessary. In this case, the 10 mN load is distributed to the columnar spacers and the load applied on each columnar spacer (temporary value) equals 1.7 mN. It is seen that the deformation of the spacers caused by the load is 0.19 μm, which is close to the deformation of the reference spacer. Thus, a withstand load equivalent to that of one reference spacer can be achieved by 5.9 spacers of the 4.0 μm column diameter.

When the spacers having the 3.2 μm column diameter (produced by use of a mask having openings 4 μm in diameter) are used, 9.2 spacers are necessary for achieving a withstand load equivalent to that of one reference spacer. When the spacers having the 2.1 μm column diameter (produced by use of a mask having openings 3 μm in diameter) are used, 21.3 spacers are necessary for achieving a withstand load equivalent to that of one reference spacer.

As explained above, even when the size (diameter) of the columnar spacer was reduced, the increasing of the number of spacers (to achieve the constant ratio of the total top area (contact area) of the columns supporting the opposing transparent substrate (the array substrate in this embodiment) per unit area) successfully reduced the load applied on each spacer and the deformation of the spacers took on substantially constant values. However, the constant deformation means that an appropriate withstand load characteristic capable of achieving both the prevention of the low-temperature bubble defects and the prevention of the unevenness in brightness by pressure cannot be obtained unless spacers of different heights are used in combination.

Next, an example (1) employing trapezoidal spacers will be explained below by referring to FIGS. 5 and 6. Meanwhile, two types of columnar spacers differing in the diameter will be used as comparative examples (1) and (2).

The trapezoidal spacer according to the example (1) was formed to have a top diameter of 4.1 μm and a bottom diameter of 10.2 μm. In this case, the top area is 13.2 μm$^2$, the bottom area is 81.7 μm$^2$, and the area ratio between the top and the bottom (top area/bottom area) is 0.16.

Meanwhile, the columnar spacer according to the comparative example (1) was formed to have a top diameter of 9.7 μm and a bottom diameter of 10.4 μm. In this case, the top area is 73.9 μm$^2$, the bottom area is 84.9 μm$^2$, and the top/bottom area ratio is 0.87.

The columnar spacer according to the comparative example (2) was formed to have a top diameter of 4.0 μm and a bottom diameter of 4.7 μm. In this case, the top area is 12.6 μm$^2$, the bottom area is 17.3 μm$^2$, and the top/bottom area ratio is 0.72.

Figures 5, 6:
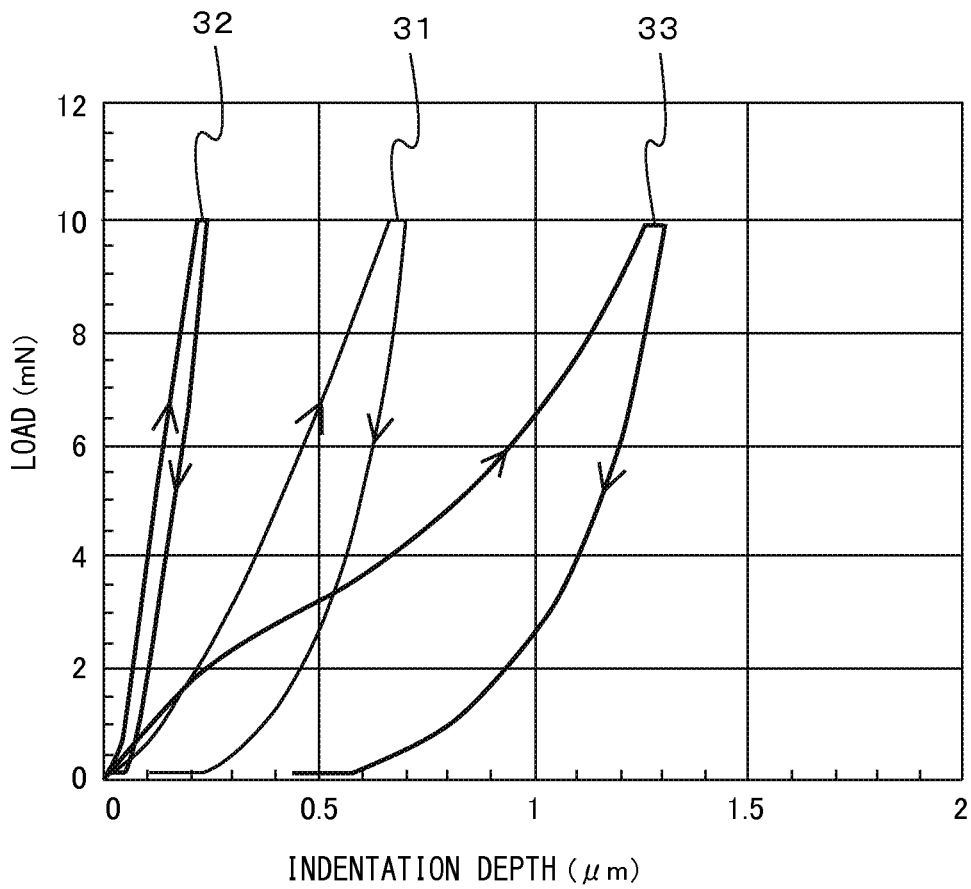
FIG. 5 is a graph showing the relationship between the applied load and the indentation depth in regard to spacers according to an example (1) and comparative examples (1) and (2).
FIG. 6 is a table showing the result of evaluation of light leakage in regard to the spacers according to the example (1) and the comparative examples (1) and (2).

FIG. 5 is a graph showing the relationship between the applied load and the indentation depth in regard to the spacers of the example (1) and the comparative examples (1) and (2). In the graph, the vertical axis represents the load (mN) and the horizontal axis represents the indentation depth (μm). A load deformation curve 31 regarding the example (1), a load deformation curve 32 regarding the comparative example (1), and a load deformation curve 33 regarding the comparative example (2) are shown as the load deformation curves indicating the relationship between the applied load and the indentation depth.

As shown in the graph of FIG. 5, the trapezoidal spacer of the example (1) exhibited a load deformation tendency close to that of the columnar spacer of the comparative example (2) (having an equivalent top area) up to a low load of approximately 0.2 mN. At higher loads, the trapezoidal spacer of the example (1) showed a tendency in between those of the columnar spacers of the comparative examples (1) and (2).

Thus, by using the trapezoidal spacer having a gentle inclination and a difference between the areas of the top and bottom surfaces, strength close to that of the columnar spacer having a thickness equivalent to the top thickness of the trapezoidal spacer was achieved in the initial stage in which the load was relatively low. At higher loads, strength in between those of the columnar spacer having the thickness equivalent to the top thickness of the trapezoidal spacer and the columnar spacer having a thickness equivalent to the bottom thickness of the trapezoidal spacer was achieved.

As above, the trapezoidal spacer, exhibiting great initial deformation, has no problem in allowing the substrate distance to change smoothly following the volume contraction of the liquid crystal at low temperatures. This is advantageous for suppressing the formation of the low-temperature bubbles.

Further, compared to the columnar spacers, the trapezoidal spacer exhibits a remarkable decrease in the deformation when the load increases. Thus, the function of maintaining the substrate distance within a prescribed range can be achieved effectively and the occurrence of the unevenness in brightness by pressure can be suppressed.

Furthermore, while it is necessary to increase the number of spacers six-fold in order to achieve pressure strength (strength against pressing force) equivalent to that of one columnar spacer according to the comparative example (1) (e.g., resistance to a high load of approximately 10 mN) by use of the columnar spacers according to the comparative example (2), sufficient pressure strength can be achieved by use of the trapezoidal spacers according to the example (1) without the need of increasing the number of spacers that much.

FIG. 6 is a table showing the result of the evaluation of the light leakage in regard to the spacers according to the example (1) and the comparative examples (1) and (2). As shown in FIG. 6, the black modulation factors when the spacers of the example (1), the comparative example (1) and the comparative example (2) were used were 0.3%, 1.4% and 1.1%, respectively. This indicates that the trapezoidal spacers according to the example (1) reduced the light leakage amount by approximately 21% compared to the columnar spacers according to the comparative example (1), and by approximately 27% compared to the columnar spacers according to the comparative example (2). This reduction in the light leakage amount (reduction in the light leakage area) can be attributed to mitigation of the disturbance of the liquid crystal molecule orientation in the vicinity of the spacers thanks to the uniform rubbing treatment (to the inside parts around the roots of the spacers) achieved by employing not the vertical structure (e.g., columnar spacers) but the trapezoidal spacers having a gentle inclination.

As above, it is found that the prevention of the low-temperature bubble defects and the unevenness in brightness by pressure can be achieved effectively by forming the spacers in trapezoidal shapes. Further, the light leakage area can be reduced compared to columnar spacers of comparable sizes.

FIG. 7 is a table showing the result of evaluation of trapezoidal spacers from other viewpoints. In this evaluation, trapezoidal spacers whose top/bottom area ratio (top area/bottom area) is 0.3 or less were used as examples (2)-(5) and trapezoidal spacers whose top/bottom area ratio is over 0.3 were used as comparative examples (3)-(6) as will be explained later.

The trapezoidal spacer according to the example (2) was formed to have a height of 4 μm, a top diameter of 3.5 and a bottom diameter of 7 μm. The top area was 9.6 μm$^2$, the bottom area was 38.5 μm$^2$, and the top/bottom area ratio (top area/bottom area) was 0.25. About this type of spacers, the formation of the low-temperature impact bubbles and the occurrence of the unevenness in brightness by pressure were checked while changing the density of the spacers arranged on the substrate. Under a density condition that the contact area ratio of the spacers in contact with the opposing substrate (i.e., total top area per unit area) is 0.8% or less, the low-temperature bubbles were prevented but the unevenness in brightness by pressure could not be prevented. Under a condition that the contact area ratio is 0.9%-1.0%, both the low-temperature bubbles and the unevenness in brightness by pressure were prevented successfully. Under a condition that the contact area ratio is 1.1% or more, the low-temperature bubbles could not be prevented but the unevenness in brightness by pressure was prevented.

The trapezoidal spacer according to the example (3) was formed to have a height of 4 μm, a top diameter of 3.5 μm and a bottom diameter of 9 μm. The top area was 9.6 μm$^2$, the bottom area was 63.6 μm$^2$, and the top/bottom area ratio was 0.15. In this case, under a condition that the contact area ratio is 0.7% or less, the low-temperature bubbles were prevented but the unevenness in brightness by pressure could not be prevented. Under a condition that the contact area ratio is 0.8%-0.9%, both the low-temperature bubbles and the unevenness in brightness by pressure were prevented successfully. Under a condition that the contact area ratio is 1.0% or more, the low-temperature bubbles could not be prevented but the unevenness in brightness by pressure was prevented.

The trapezoidal spacer according to the example (4) was formed to have a height of 4 μm, a top diameter of 4.5 μm and a bottom diameter of 9 μm. The top area was 15.9 μm$^2$, the bottom area was 63.6 μm$^2$, and the top/bottom area ratio was 0.25. In this case, under a condition that the contact area ratio is 0.8% or less, the low-temperature bubbles were prevented but the unevenness in brightness by pressure could not be prevented. Under a condition that the contact area ratio is 0.9%-1.0%, both the low-temperature bubbles and the unevenness in brightness by pressure were prevented successfully. Under a condition that the contact area ratio is 1.1% or more, the low-temperature bubbles could not be prevented but the unevenness in brightness by pressure was prevented.

The trapezoidal spacer according to the example (5) was formed to have a height of 4 μm, a top diameter of 5.5 μm and a bottom diameter of 11 μm. The top area was 23.8 μm$^2$, the bottom area was 95.0 μm$^2$, and the top/bottom area ratio was 0.25. In this case, under a condition that the contact area ratio is 0.8% or less, the low-temperature bubbles were prevented but the unevenness in brightness by pressure could not be prevented. Under a condition that the contact area ratio is 0.9%-1.0%, both the low-temperature bubbles and the unevenness in brightness by pressure were prevented successfully. Under a condition that the contact area ratio is 1.1% or more, the low-temperature bubbles could not be prevented but the unevenness in brightness by pressure was prevented.

The trapezoidal spacer according to the comparative example (3) was formed to have a height of 4 μm, a top diameter of 3.5 μm and a bottom diameter of 6 μm. The top area was 9.6 μm$^2$, the bottom area was 28.3 μm$^2$, and the top/bottom area ratio was 0.34. In this case, under a condition that the contact area ratio is 0.8% or less, the low-temperature bubbles were prevented but the unevenness in brightness by pressure could not be prevented. Under a condition that the contact area ratio is 0.9%-1.1%, neither of the low-temperature bubbles and the unevenness in brightness by pressure could be prevented. Under a condition that the contact area ratio is 1.2% or more, the low-temperature bubbles could not be prevented but the unevenness in brightness by pressure was prevented.

The trapezoidal spacer according to the comparative example (4) was formed to have a height of 4 μm, a top diameter of 4.5 μm and a bottom diameter of 8 μm. The top area was 15.9 μm$^2$, the bottom area was 50.3 μm$^2$, and the top/bottom area ratio was 0.32. In this case, under a condition that the contact area ratio is 0.8% or less, the low-temperature bubbles were prevented but the unevenness in brightness by pressure could not be prevented. Under a condition that the contact area ratio is 0.9%-1.0%, neither of the low-temperature bubbles and the unevenness in brightness by pressure could be prevented. Under a condition that the contact area ratio is 1.1% or more, the low-temperature bubbles could not be prevented but the unevenness in brightness by pressure was prevented.

The trapezoidal spacer according to the comparative example (5) was formed to have a height of 4 μm, a top diameter of 6 μm and a bottom diameter of 10 μm. The top area was 28.3 μm$^2$, the bottom area was 78.5 μm$^2$, and the top/bottom area ratio was 0.36. In this case, under a condition that the contact area ratio is 0.7% or less, the low-temperature bubbles were prevented but the unevenness in brightness by pressure could not be prevented. Under a condition that the contact area ratio is 0.8%-1.1%, neither of the low-temperature bubbles and the unevenness in brightness by pressure could be prevented. Under a condition that the contact area ratio is 1.2% or more, the low-temperature bubbles could not be prevented but the unevenness in brightness by pressure was prevented.

In the comparative example (6), main spacers having a height of 4 μm, a top diameter of 7 μm and a bottom diameter of 11 μm and auxiliary spacers having a height of 3.5 μm, a top diameter of 6 μm and a bottom diameter of 10 μm were used in combination. Regarding the main spacer, the top area was 38.5 μm², the bottom area was 95.0 μm², and the top/bottom area ratio was 0.40. Regarding the auxiliary spacer, the top area was 28.3 μm², the bottom area was 78.5 μm², and the top/bottom area ratio was 0.36. In this case, both the low-temperature bubbles and the unevenness in brightness by pressure were prevented successfully under a condition that the contact area ratio of the main spacers is 0.1% and that of the auxiliary spacers is 1.2%.

In this evaluation, it was impossible as indicated by the comparative examples (3)-(5) to achieve both the prevention of the low-temperature bubble defects and the prevention of the unevenness in brightness by pressure by using spacers of a uniform height in cases where the top/bottom area ratio was over 0.3. In contrast, it was possible as indicated by the examples (2)-(5) to achieve both the prevention of the low-temperature bubble defects and the prevention of the unevenness in brightness by pressure in cases where the top/bottom area ratio was 0.3 or less even though spacers of a uniform height were used. More specifically, with the spacers whose top/bottom area ratio is 0.15, both the prevention of the low-temperature bubble defects and the prevention of the unevenness in brightness by pressure were achieved successfully by arranging the spacers at appropriate density so that the contact area ratio is within the range of 0.8%-0.9%. With the spacers whose top/bottom area ratio is 0.25, both the prevention of the low-temperature bubble defects and the prevention of the unevenness in brightness by pressure were achieved successfully by arranging the spacers so that the contact area ratio is within the range of 0.9%-1.0%. As above, while the appropriate range of the contact area ratio slightly changes depending on the top/bottom area ratio, it can be understood that an appropriate condition exists within the contact area ratio range of 0.8%-1.0% when the top/bottom area ratio is 0.3 or less.

The trapezoidal spacers can easily be miniaturized below 10 μm compared to columnar spacers. Further, the trapezoidal spacers allow for the rubbing treatment to the vicinity of the spacers and the increasing of the pixel aperture ratio in comparison with columnar spacers of equivalent diameters.

Therefore, the employment of the trapezoidal spacers for high-definition liquid crystal display panels needing minute spacers for securing a high pixel aperture ratio (liquid crystal display panels having resolution over 400 ppi) is especially effective. However, the advantages like the quality improvement, the increase in the yields, the cost reduction, etc. can be achieved equally even if the trapezoidal spacers are employed for liquid crystal display panels having resolution within 400 ppi.

As described above, according to the present invention, both the prevention of the low-temperature bubble defects and the prevention of the unevenness in brightness by pressure can be achieved without the need of forming multiple types of spacers differing in the height.

While embodiments of the present invention have been described above with reference to figures, it goes without saying that the present invention is not to be restricted to those particular illustrative embodiments and a variety of modifications, design changes, etc. are possible without departing from the spirit and scope of the present invention.

What is claimed is:

1. A liquid crystal display panel comprising a liquid crystal encapsulated between a first substrate and a second substrate, wherein:
   the distance between the first substrate and the second substrate is determined by a plurality of spacers formed on the first substrate or the second substrate;
   the spacers are of a uniform height, each of the spacers has a top surface and a bottom surface, and an area ratio between the top surface and the bottom surface is 0.25 or less;
   a cross section of each of the spacers along a plane orthogonal to a principal plane of the first substrate or the second substrate is substantially in a trapezoidal shape,
   a cross section of each of the spacers along a plane in parallel to the principal plane of the first substrate or the second substrate is in a circular shape, and
   the diameter of the cross section of each of the spacers along a plane in parallel to the principal plane of the first substrate or the second substrate is within 11 μm.

2. The liquid crystal display panel according to claim 1, wherein the diameter of the cross section of each of the spacers is that of the bottom surface of each of the spacers.

\* \* \* \* \*